US012624240B2

(12) United States Patent
Maeda et al.

(10) Patent No.: US 12,624,240 B2
(45) Date of Patent: May 12, 2026

(54) PRE-COATING AGENT, INK SET FOR INKJET RECORDING, AND LAMINATE

(71) Applicant: SAKATA INX CORP., Osaka (JP)

(72) Inventors: Hirohito Maeda, Osaka (JP); Hiroyuki Konishi, Osaka (JP); Yuya Watanabe, Osaka (JP); Ryohei Miyake, Osaka (JP)

(73) Assignee: SAKATA INX CORP., Osaka (JP)

( * ) Notice: Subject to any disclaimer, the term of this patent is extended or adjusted under 35 U.S.C. 154(b) by 160 days.

(21) Appl. No.: 18/552,572

(22) PCT Filed: Mar. 22, 2022

(86) PCT No.: PCT/JP2022/013063
§ 371 (c)(1),
(2) Date: Sep. 26, 2023

(87) PCT Pub. No.: WO2022/210076
PCT Pub. Date: Oct. 6, 2022

(65) Prior Publication Data
US 2024/0158659 A1 May 16, 2024

(30) Foreign Application Priority Data

Mar. 31, 2021 (JP) ................................. 2021-060085

(51) Int. Cl.
| | |
|---|---|
| C09D 11/54 | (2014.01) |
| B41J 2/01 | (2006.01) |
| B41J 2/21 | (2006.01) |
| B41M 5/00 | (2006.01) |
| C09D 5/02 | (2006.01) |
| C09D 7/40 | (2018.01) |
| C09D 7/61 | (2018.01) |
| C09D 7/63 | (2018.01) |
| C09D 11/106 | (2014.01) |
| C09D 11/322 | (2014.01) |
(Continued)

(52) U.S. Cl.
CPC ................ C09D 11/54 (2013.01); B41J 2/01 (2013.01); B41J 2/2107 (2013.01); C09D 5/024 (2013.01); C09D 7/61 (2018.01); C09D 7/63 (2018.01); C09D 7/69 (2018.01); C09D 11/106 (2013.01); C09D 11/322 (2013.01); C09D 11/38 (2013.01); C09D 11/40 (2013.01); B41M 5/0017 (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 8,765,852 | B1 * | 7/2014 | Swei ..................... | C09D 133/08 524/277 |
| 8,980,408 | B2 | 3/2015 | Gotou et al. | |
| 2005/0174411 | A1 * | 8/2005 | Adachi ................ | B41M 5/0017 347/100 |
| 2005/0243121 | A1 * | 11/2005 | Onishi ................... | B41J 2/2114 347/14 |
| 2006/0170746 | A1 * | 8/2006 | Jackson ................. | C09D 11/40 347/100 |
| 2007/0054981 | A1 * | 3/2007 | Yanagi ................... | C09D 11/40 523/160 |

FOREIGN PATENT DOCUMENTS

| | | |
|---|---|---|
| CN | 101709548 | 5/2010 |
| CN | 103057231 | 4/2013 |
(Continued)

*Primary Examiner* — Manish S Shah
(74) *Attorney, Agent, or Firm* — HSML P.C.

(57) ABSTRACT

The present invention provides a pre-coating agent capable of, without containing a polyvalent metal salt, preventing or reducing mottling and bleeding to improve the print image quality and preventing or reducing strike-through of an ink composition for inkjet recording during printing using the ink composition for inkjet recording, as well as being capable of preventing or reducing peeling and a decrease in hardness of an overcoat layer in the post-process (formation of the overcoat layer). Provided is a pre-coating agent for forming a precoat layer to receive an ink composition for inkjet recording, the pre-coating agent containing inorganic particles, an amine salt of an organic acid, a resin emulsion, and water, the inorganic particles having a particle size of 1 $\mu m$ to 10 $\mu m$, the pre-coating agent being free from a polyvalent metal salt.

8 Claims, No Drawings

(51) Int. Cl.
    *C09D 11/38*        (2014.01)
    *C09D 11/40*        (2014.01)

(56)         References Cited

U.S. PATENT DOCUMENTS

| | | | | |
|---|---|---|---|---|
| 2009/0203823 A1* | 8/2009 | Sasada | ........... | C09D 11/326 |
| | | | | 524/386 |
| 2010/0295891 A1* | 11/2010 | Goto | ........... | C09D 11/54 |
| | | | | 347/21 |

(Continued)

| | | | | |
|---|---|---|---|---|
| 2010/0302307 A1* | 12/2010 | Tahara | ........... | C09D 11/322 |
| | | | | 427/256 |
| 2014/0132661 A1* | 5/2014 | Inumaru | ........... | C09D 11/322 |
| | | | | 524/24 |
| 2015/0197654 A1* | 7/2015 | Okuda | ........... | C09D 11/322 |
| | | | | 524/88 |
| 2017/0136782 A1* | 5/2017 | Yatake | ........... | C09D 11/40 |

FOREIGN PATENT DOCUMENTS

| | | |
|---|---|---|
| CN | 105131747 | 12/2015 |
| EP | 2 894 203 | 7/2015 |
| EP | 2 872 338 | 3/2017 |
| JP | 2004-255772 | 9/2004 |
| JP | 2004-299248 | 10/2004 |
| JP | 2010-005832 | 1/2010 |
| JP | 2012-045738 | 3/2012 |
| JP | 2012-111845 | 6/2012 |
| JP | 2013-180408 | 9/2013 |
| JP | 2014-073672 | 4/2014 |
| WO | 03/043825 | 5/2003 |

* cited by examiner

PRE-COATING AGENT, INK SET FOR INKJET RECORDING, AND LAMINATE

TECHNICAL FIELD

The present invention relates to a pre-coating agent, an ink set for inkjet recording, and a laminate.

BACKGROUND ART

In known image forming methods, the image quality is improved by applying or ejecting a pre-coating agent (pre-treatment liquid) to the surface of a substrate before an ink composition for inkjet recording is ejected and pigments are aggregated on the substrate.

For example, Patent Literature 1 discloses an image forming method including: a pre-treatment step of applying a pre-treatment liquid to a recording medium including a support and a coat layer on the support; an image forming step of applying an inkjet ink containing a colorant, a water-soluble organic solvent, a surfactant, a penetrant, and water to the face with the pre-treatment liquid applied thereto to form an image; and a post-treatment step of applying a post-treatment liquid to the face with the inkjet ink applied thereto to form a protective layer. In the method, the amount of pure water transferred to the coat layer of the recording medium in the contact period of 100 ms, measured using a dynamic scanning liquid absorptiometer, is 1 to 10 mL/m$^2$, and at least one of the pre-treatment liquid or the post-treatment liquid contains water and an aqueous resin and further contains one of colloidal silica, barium sulfate, and titanium oxide.

Patent Literature 2 discloses a recording medium including a support and at least one ink-receiving layer on the support. In the recording medium, the ink-receiving layer contains inorganic fine particles, cationic organic fine particles, and a water-soluble polyvalent metal salt, and the cationic organic fine particles are contained in the ink-receiving layer containing the cationic organic fine particles in an amount of 0.1 to 25% by mass based on the dry mass of the ink-receiving layer.

Conventional methods, however, have problems when printing is performed on a support (substrate) using an ink composition for inkjet recording, including occurrence of mottling (solid filling) or bleeding in areas with a high print rate, which lowers the image quality, and penetration of the ink composition for inkjet recording to the back side of the support (substrate), which causes strike-through of the ink composition for inkjet recording.

In conventional methods, a pre-treatment liquid (pre-coating agent) containing a polyvalent metal salt is preferred from the standpoint of improving the fixation of pigments. However, the polyvalent metal salt in the pre-treatment liquid may react with an overcoat resin used in the post-process (formation of an overcoat layer), disadvantageously causing peeling or a decrease in hardness of the overcoat layer.

CITATION LIST

Patent Literature

Patent Literature 1: JP 2014-073672 A
Patent Literature 2: JP 2004-255772 A

SUMMARY OF INVENTION

Technical Problem

The present invention has been made in view of the above-described problems, and aims to provide a pre-coating agent capable of, without containing a polyvalent metal salt, preventing or reducing mottling and bleeding to improve the print image quality and preventing or reducing strike-through of an ink composition for inkjet recording during printing using the ink composition for inkjet recording, as well as being capable of preventing or reducing peeling and a decrease in hardness of an overcoat layer in the post-process (formation of the overcoat layer).

Solution to Problem

The present inventors have made intensive studies in view of the above-described problems, and found that when a pre-coating agent for forming a precoat layer to receive an ink composition for inkjet recording contains inorganic particles having a specific particle size, an amine salt of an organic acid, a resin emulsion, and water, the pre-coating agent can solve all the problems described above without using a polyvalent metal salt. Thus, the present invention was completed.

Specifically, the present invention relates to a pre-coating agent for forming a precoat layer to receive an ink composition for inkjet recording, the pre-coating agent containing inorganic particles, an amine salt of an organic acid, a resin emulsion, and water, the inorganic particles having a particle size of 1 μm to 10 μm, the pre-coating agent being free from a polyvalent metal salt.

Preferably, the inorganic particles in the pre-coating agent of the present invention are porous silica particles.

Preferably, the amine salt of an organic acid is a salt obtained by neutralizing at least one selected from polyacrylic acid, formic acid, acetic acid, glycolic acid, malonic acid, malic acid, maleic acid, succinic acid, glutaric acid, fumaric acid, citric acid, tartaric acid, lactic acid, and derivatives of these, with an amine.

Preferably, the resin emulsion includes at least one of a styrene-acrylic emulsion or a vinyl acetate emulsion.

The present invention also relates to an ink set for inkjet recording including the pre-coating agent and an ink composition for inkjet recording.

Preferably, the ink composition for inkjet recording in the ink set for inkjet recording of the present invention is an ink composition for aqueous inkjet recording.

Preferably, the ink composition for aqueous inkjet recording contains a pigment coated with an alkali-soluble resin, a basic compound, and a water-soluble organic solvent.

The present invention also relates to a laminate sequentially including, on a substrate, a print layer formed using the ink set for inkjet recording and an overcoat layer containing a resin.

Advantageous Effects of Invention

The present invention can provide a pre-coating agent capable of, without containing a polyvalent metal salt, preventing or reducing mottling and bleeding to improve the print image quality and preventing or reducing strike-through of an ink composition for inkjet recording during printing using the ink composition for inkjet recording, as well as being capable of preventing or reducing peeling and a decrease in hardness of an overcoat layer in the post-process (formation of the overcoat layer).

DESCRIPTION OF EMBODIMENTS

<Pre-Coating Agent>

The present invention provides a pre-coating agent for forming a precoat layer to receive an ink composition for inkjet recording, the pre-coating agent containing inorganic particles, an amine salt of an organic acid, a resin emulsion, and water, the inorganic particles having a particle size of 1 μm to 10 μm, the pre-coating agent being free from a polyvalent metal salt.

The pre-coating agent of the present invention can give the following effects to the resulting precoat layer. The inorganic particles having a specific particle size in the pre-coating agent of the present invention give a filling effect by preventing the droplets of the ink composition for inkjet recording, after being ejected from the inkjet nozzle and landing on a substrate described later, from excessively penetrating the substrate and striking through the substrate. The organic acid obtained by drying the amine salt of an organic acid in the pre-coating agent of the present invention reacts with a compound contained in the ink composition for inkjet recording, thereby preventing or reducing mottling and bleeding to improve the print image quality. The resin emulsion in the pre-coating agent of the present invention prevents or reduces fall of the inorganic particles and the amine salt of an organic acid from the substrate.

However, the present invention is not necessarily construed as being limited to the above mechanism.

(Inorganic Particles)

The pre-coating agent of the present invention contains inorganic particles.

Examples of the inorganic particles include at least one selected from titanium dioxide particles, silica particles, alumina particles, iron oxide particles, iron hydroxide particles, and tin oxide particles.

The inorganic particles are preferably porous particles, more preferably porous silica particles.

One type of the inorganic particles may be used alone, or two or more types of the inorganic particles may be used in combination.

The inorganic particles have a particle size of 1 μm to 10 μm.

When the particle size of the inorganic particles is smaller than 1 μm, the effect of preventing or reducing strike-through is lowered. When it exceeds 10 μm, the smoothness of the coating film formed from the pre-coating agent is reduced, resulting in lower print image quality.

The inorganic particles more preferably have a particle size of 3 μm to 7 μm.

The term "particle size" herein means a volume-average particle size measured using a particle size distribution analyzer based on the laser diffraction scattering as the measurement principle.

When the inorganic particles are porous particles, the average pore size is preferably 10 nm or larger and 300 nm or smaller, more preferably 10 nm or larger and 200 nm or smaller. The term "average pore size" herein refers to the average pore size calculated from the pore volume and the specific surface area.

The pore volume is preferably 10 mL/g to 200 mL/g, more preferably 30 mL/g to 100 mL/g.

The pore volume and the specific surface area each can be calculated based on the pore distribution obtained by a gas adsorption method (using nitrogen gas). Specifically, the BJH method can be used for calculation of the total pore volume, and the BET method can be used for calculation of the specific surface area. An apparatus usable in the gas adsorption method may be, for example, Autosorb 3 (product name) available from Quantachrome Corporation.

When the inorganic particles are porous particles, the porosity is not limited. The porosity is preferably 20% or higher and 90% or lower, more preferably 30% or higher and 85% lower, for example.

The porosity can be calculated based on the pore volume mentioned above.

The amount of the inorganic particles is preferably 1 to 10% by mass, more preferably 3 to 7% by mass, based on the total mass of the pre-coating agent.

(Amine Salt of Organic Acid)

The pre-coating agent of the present invention contains an amine salt of an organic acid.

The term "an amine salt of an organic acid" means a salt obtained by neutralizing an organic acid with an amine.

The organic acid includes, for example, at least one selected from polyacrylic acid, formic acid, acetic acid, glycolic acid, malonic acid, malic acid, maleic acid, succinic acid, glutaric acid, fumaric acid, citric acid, tartaric acid, lactic acid, and derivatives thereof.

From the standpoint of preventing or reducing uneven application of the pre-coating agent and suitably achieving the effect of the present invention, preferred is a water-soluble organic acid, more preferred is a water-soluble polyvalent carboxylic acid, and still more preferred is citric acid or malic acid.

The amine is preferably a volatile amine, such as ammonia, a mono-, di-, or trialkyl (C1-C4) amine, a monoalkanol (C2-C3) amine, or a mono- or dialkyl (C1-C4) monoalkanol (C2-C3) amine.

More specifically, the amine used may be at least one selected from ammonia; a mono- or di- or trialkyl (C1-C4) amine such as methylamine, dimethylamine, trimethylamine, ethylamine, triethylamine, propylamine, or butylamine; and a monoalkanol amine such as monoethanolamine or monopropanolamine, and a mono- or dialkyl (C1-C4) monoalkanolamine such as dimethylaminoethanol.

Preferred among these is ammonia because it can suitably impart cohesiveness to the coating film of the pre-coating agent and is less likely to remain on a substrate described later.

These amine salts of the organic acids may be used alone or in combination of two or more.

The amount of the amine salt of the organic acid is preferably 1 to 10% by mass, more preferably 3 to 7% by mass, based on the total mass of the pre-coating agent.

(Resin Emulsion)

The pre-coating agent of the present invention contains a resin emulsion.

Examples of the resin emulsion include emulsions of acrylic resins, ester resins, urethane resins, vinyl acetate resins, vinyl chloride resins, styrene resins, butadiene resins, and styrene acrylic resins.

Preferred among these are styrene acrylic emulsions and/or vinyl acetate emulsions because they impart excellent cohesiveness to the coating film of the pre-coating agent and suitably impart coating film durability.

These resin emulsions can be used alone or in combination of two or more.

From the standpoint of fixing the inorganic particles to the substrate, the resin emulsion preferably has a glass transition temperature of 30° C. or lower, more preferably 20° C. or lower.

The glass transition temperature of the resin emulsion can be measured by differential scanning calorimetry (DSC) in accordance with JIS K 7121:2012 "Testing Methods for Transition Temperature of Plastics", for example.

The resin emulsion is preferably contained as a solid content in an amount of 0.1 to 10% by mass, more preferably 0.5 to 5% by mass, based on the total mass of the pre-coating agent.

Examples of the resin emulsion include those obtained by emulsifying any of the resins exemplified above in a later-described aqueous medium using a low-molecular-weight emulsifier, those obtained by emulsifying any of the resins exemplified above in a later-described aqueous medium using a polymeric emulsifier, and those obtained by emulsifying any of the resins exemplified above in a later-described aqueous medium by self-emulsification.

Examples of the low-molecular emulsifier include monosaccharide or polysaccharide fatty acid esters, polyglyceryl fatty acid esters, organic acid monoglycerides, propylene glycol fatty acid esters, polyglyceryl-condensed ricinoleic acid esters, sorbitan fatty acid esters, polyoxyethylene sorbitan fatty acid esters, polyoxyethylene alkyl ethers, alkylbenzene sulfonates, alkane sulfonates, $\alpha$-olefin sulfonates, polyoxyethylene alkyl ether sulfates, alkyl sulfates, polyoxyethylene alkyl ether phosphates, tetraalkyl ammonium salts, alkyl benzyl dimethyl ammonium salts, fatty acid amidoamines, alkyl pyridinium salts, alkyl betaines, and alkyl amine oxides.

(Water)

The pre-coating agent of the present invention contains water.

Commercially available purified water or the like can be used as the water.

In order to suitably achieve flowability of the pre-coating agent and suitably impart abrasion resistance of the coating film formed from the pre-coating agent, the water is preferably contained in an amount of 50 to 95% by mass, more preferably 70 to 90% by mass, based on the total mass of the pre-coating agent.

The water content is the sum of the amount of water in the resin emulsion and the amount of water other than the aqueous medium in the resin emulsion.

(Others)

The pre-coating agent of the present invention preferably contains a surfactant, a thickener, and/or a pH adjuster as needed.

Any known surfactant that is added to impart leveling properties and does not impair the performance of the pre-coating agent of the present invention may be appropriately selected.

Any known nonionic or anionic thickener that does not react with the organic acid may be appropriately selected.

Any known pH adjuster may be appropriately selected. From the standpoint of volatility, preferred is ammonia, for example.

The amounts of the surfactant, the thickener, and the pH adjuster are each 0.01 to 5% by mass, based on the total mass of the pre-coating agent, for example.

The pre-coating agent of the present invention containing the components described above may also contain various appropriately selected known additives such as a dispersant, a dispersion aid, a wetting agent, a defoaming agent, an antifungal agent, and an antirust agent.

The pre-coating agent of the present invention is free from a polyvalent metal salt from the standpoint of preventing or reducing peeling or a decrease in hardness of an overcoat layer described later.

The polyvalent metal salt is composed of polyvalent metal ions having a valence of 2 or higher and anions that bind to these polyvalent metal ions, and is soluble in water.

Examples of polyvalent metal ions include $Ca^{2+}$, $Cu^{2+}$, $Ni^{2+}$, $Mg^{2+}$, $Zn^{2+}$, and $Ba^{2+}$. Examples of anions include $Cl^-$, $NO^{3-}$, $I^-$, $Br^-$, and $ClO^{3-}$.

(Method for Producing the Pre-Coating Agent)

A method for producing the pre-coating agent of the present invention may be any method that includes, for example, kneading the above-described components and optionally added additives.

From the standpoint of application properties, the pre-coating agent of the present invention preferably has a viscosity of 10 to 40 seconds, more preferably 15 to 25 seconds, as measured by Zahn Cup No. 3 (available from RIGO).

The pre-coating agent of the present invention preferably has a pH of 7 to 9 from the standpoint of miscibility of materials and storage stability.

<Ink Set for Inkjet Recording>

The ink set for inkjet recording of the present invention includes the pre-coating agent of the present invention and an ink composition for inkjet recording.

The ink composition for inkjet recording will be described below.

The ink set for inkjet recording of the present invention includes an ink composition for inkjet recording.

The ink composition for inkjet recording is preferably an ink composition for aqueous inkjet recording.

The ink composition for aqueous inkjet recording preferably contains a pigment coated with an alkali-soluble resin, a basic compound, and a water-soluble organic solvent.

(Pigment)

The pigment may be any of various inorganic pigments and organic pigments commonly used in inkjet inks.

Examples of inorganic pigments include colored pigments (including achromatic colored pigments, such as white and black pigments) such as titanium oxide, colcothar, Antimony red, Cadmium yellow, Cobalt blue, Prussian blue, ultramarine, carbon black, and graphite, and extenders such as calcium carbonate, kaolin, clay, barium sulfate, aluminum hydroxide, and talc.

Examples of organic pigments include soluble azo pigments, insoluble azo pigments, azo lake pigments, condensed azo pigments, copper phthalocyanine pigments, and condensed polycyclic pigments.

These may be used alone or in combination of two or more.

Specifically, the pigment is preferably a red pigment such as C.I. Pigment Red 5, 7, 12, 57:1, 122, 146, 202, 242, or 282; a blue pigment such as C.I. Pigment Blue 1, 2, 15:3, 15:4, 16, 17, or 60; a purple pigment such as C.I. Pigment Violet 19 or 23; a yellow pigment such as C.I. Pigment Yellow 12, 13, 14, 17, 74, 83, 93, 128, 139, 151, 154, 155, 180, 185, or 213; a black pigment such as C.I. Pigment Black 7 (carbon black); a green pigment such as C.I. Pigment Green 7 or 36; or an orange pigment such as C.I. Pigment Orange 34 or 71 because these pigments enable vivid hue expression.

(Alkali-Soluble Resin)

An alkali-soluble resin satisfying the following (a) to (c) can be used as an alkali soluble resin for coating the pigment.

(a) The acid value of the alkali-soluble resin is 40 to 300 mg KOH/g.

(b) The acid groups in the alkali-soluble resin in an amount of 50 to 90% are neutralized with a basic compound.

(c) The alkali-soluble resin contains, as constituent monomers thereof, lauryl (meth)acrylate in an amount of 20 to 40% by mass in the alkali-soluble resin, and a monomer having an aromatic ring, preferably, a styrene monomer.

Such an alkali-soluble resin used may contain a monomer containing a carboxy group as a structural unit, for example. For higher pigment adsorption, the alkali-soluble resin may be a copolymer of the monomer containing a carboxy group with lauryl (meth)acrylate and a monomer having an aromatic ring, or a copolymer obtainable by copolymerizing these monomers with different polymerizable monomer(s) as needed.

Examples of monomers containing carboxy groups include acrylic acid, methacrylic acid, crotonic acid, itaconic acid, maleic acid, fumaric acid, 2-carboxyethyl (meth)acrylate, 2-carboxypropyl (meth)acrylate, maleic anhydride, maleic acid monoalkyl esters, citraconic acid, citraconic anhydride, and citraconic acid monoalkyl esters.

Examples of monomers containing hydrophobic groups for improving the pigment adsorption include, as lauryl (meth)acrylate and a monomer having an aromatic ring, styrene monomers such as styrene, α-styrene, and vinyl toluene, and benzyl (meth)acrylate. The term "styrene monomer" herein refers to a compound containing styrene as a basic skeleton and optionally containing any substituent. The alkali-soluble resin preferably contains 30 to 60% by mass of a monomer having an aromatic ring, preferably a styrene monomer.

The alkali-soluble resin preferably contains 20 to 40% by mass of lauryl (meth)acrylate from the standpoint of dispersion stability and solidification properties. It is not necessary to use stearyl (meth)acrylate. However, it is possible to use stearyl (meth)acrylate together with lauryl (meth)acrylate to the extent that the effect given by the use of lauryl (meth) acrylate is not impaired.

Examples of different polymerizable monomers that can be optionally used as long as the performance is not impaired include methacrylic acids such as methyl (meth) acrylate, ethyl (meth)acrylate, propyl (meth)acrylate, isopropyl (meth)acrylate, butyl (meth)acrylate, and hexyl (meth)acrylate, hydroxyethyl (meth)acrylate, acrylamide, N-methylolacrylamide, 2-ethylhexyl (meth)acrylate, octyl (meth)acrylate, stearyl (meth)acrylate, 2-hydroxystearyl (meth)acrylate, dodecyl vinyl ether, vinyl 2-ethylhexanoate, vinyl laurate, vinyl stearate, cyclohexyl (meth)acrylate, and benzyl (meth)acrylate.

The acid value of the alkali-soluble resin is preferably 40 to 300 mg KOH/g, more preferably 70 to 250 mg KOH/g. When the acid value of the alkali-soluble resin is lower than 40 mg KOH/g, the resulting aqueous dispersion of the pigment coated with the alkali-soluble resin may have lower dispersion stability. When the acid value of the alkali-soluble resin is higher than 300 mg KOH/g, the hydrophilicity becomes too high, possibly resulting in lower storage stability or lower water resistance.

The acid groups in the alkali-soluble resin in an amount of 50% to 90% are preferably neutralized with a basic compound. When only less than 50% of the acid groups are neutralized, the dispersion stability may be lowered. When more than 90% of the acid groups are neutralized, the storage stability and the water resistance may be lowered. As for the molecular weight of the alkali-soluble resin, the weight average molecular weight is preferably 3,000 to 100,000, more preferably 10,000 to 50,000. When the weight average molecular weight of the alkali-soluble resin is less than 3,000, the dispersion stability of the pigment and the scratch resistance of the resulting print layer tend to be lowered. When the weight average molecular weight of the alkali-soluble resin is more than 100,000, the viscosity is unfavorably increased.

The acid value of the alkali-soluble resin herein is the theoretical acid value determined by arithmetically calculating the number of milligrams of potassium hydroxide theoretically required to neutralize 1 g of the alkali-soluble resin based on the composition of the monomers used for synthesizing the alkali-soluble resin.

The weight average molecular weight of the alkali-soluble resin can be measured by a gel permeation chromatography (GPC) method.

The weight average molecular weight can be determined as a polystyrene-equivalent weight average molecular weight by chromatography using Water 2690 (produced by Waters Corporation) as a GPC device and PLgel 5μ MIXED-D (produced by Polymer Laboratories) as a column, for example.

(Basic Compound)

Examples of basic compounds usable for neutralizing the acid groups of the alkali-soluble resin include inorganic basic compounds such as sodium hydroxide and potassium hydroxide, and organic basic compounds such as ammonia, methylamine, ethylamine, monoethanolamine, N,N-dimethylethanolamine, N,N-diethylethanolamine, N,N-dibutylethanolamine, diethanolamine, N-methyldiethanolamine, triethanolamine, morpholine, N-methylmorpholine, and N-ethylmorpholine. These basic compounds can be used alone or in combination of two or more. From the standpoint of pigment dispersion, suitably used among these are alkanolamines such as monoethanolamine, N,N-dimethylethanolamine, N,N-diethylethanolamine, N,N-dibutylethanolamine, diethanolamine, N-methyldiethanolamine, and triethanolamine.

(Bifunctional or Higher Functional Crosslinking Agent)

The bifunctional or higher functional crosslinking agent used in the production of the coated pigment is used to appropriately crosslink the alkali-soluble resin. The crosslinking agent used in the present invention is a crosslinking agent having two or more reactive functional groups, and the molecular weight of the crosslinking agent is preferably in the range of 100 to 2,000 from the standpoint of ease of reaction and the storage stability.

The reactive functional groups preferably include one or more selected from the group consisting of an epoxy group, a hydroxy group, and an a lysine group. From the standpoint of the viscosity and tolerance, preferred among these is an epoxy group. More preferred is a bifunctional or higher functional epoxy compound.

Specific examples of the bifunctional or higher functional epoxy compound include Epolite 40E, 100E, 200E, 400E, 70P, 200P, 400P, 1500NP, 1600, and 80MF (all available from Kyoeisha Chemical Co., Ltd.), and Denacol EX-201, EX-211, EX-212, EX-313, EX-314, EX-321, EX-411, EX-421, EX-512, EX-521, EX-611, EX-612, EX-614, EX-614B, and EX-622 (all available from Nagase ChemteX Corporation).

(Production of Coated Pigment)

The coated pigment is produced as follows. An alkali-soluble resin in which the acid groups are neutralized with a basic compound and a pigment are dispersed or dissolved in an aqueous solvent, followed by salting out of the alkali-soluble resin, whereby the alkali-soluble resin is insolubilized and attached to the surface of the pigment.

The acid groups in the insolubilized and attached resin in an amount of 50% to 90% were neutralized. A dispersion is obtained in which the pigment coated with the alkali-soluble resin thus obtained is dispersed, and a crosslinking agent is added to the dispersion. The resulting mixture is heated to crosslink and insolubilize the alkali-soluble resin coating the surface of the pigment, whereby a coated pigment was produced.

At this time, the resulting crosslinked alkali-soluble resin has a crosslinking rate of 10% to 90%, preferably 20% to 80%, more preferably 30% to 70%, still more preferably 35% to 50%, relative to the theoretical acid value of the alkali-soluble resin. When the crosslinking rate is lower than 10%, the pigment coating strength is possibly insufficient. When it is higher than 90%, the dispersion stability of the pigment is possibly impaired.

(Water-Soluble Organic Solvent)

The water-soluble organic solvent is used as an aqueous medium together with water.

The water used is preferably deionized water or distilled water from which metal ions and the like have been removed.

A water-soluble organic solvent contained in the ink composition may sometimes impart more excellent inkjet printability in terms of storage stability, ejection stability, ink flying properties, and the like. Examples of such water-soluble organic solvents include monoalcohols, polyhydric alcohols, lower alkyl ethers of polyhydric alcohols, ketones, ethers, esters, and nitrogen-containing compounds. These may be used alone or in combination of two or more.

Specific examples of monoalcohols include methanol, ethanol, n-propanol, n-butanol, n-pentanol, n-hexanol, n-heptanol, n-octanol, n-nonyl alcohol, n-decanol, isomers of these, cyclopetanol, and cyclohexanol. Preferred are alcohols having a C1-C6 alkyl group.

Specific examples of polyhydric alcohols include ethylene glycol, propylene glycol, 1,3-butylene glycol, 1,4-butylene glycol, 1,2-pentanediol, 1,5-pentanediol, neopentyl glycol, 1,2-hexanediol, 1,6-hexanediol, 1,2-cyclohexanediol, heptanediol, 1,8-octanediol, 1,9-nonanediol, 1,10-decanediol, glycerol, pentaerythritol, diethylene glycol, dipropylene glycol, triethylene glycol, tetraethylene glycol, polyethylene glycol, polypropylene glycol, and thiodiglycol.

Specific examples of lower alkyl ethers of polyhydric alcohols include ethylene glycol monomethyl ether, ethylene glycol dimethyl ether, ethylene glycol monoethyl ether, ethylene glycol diethyl ether, ethylene glycol monopropyl ether, ethylene glycol isopropyl ether, ethylene glycol monobutyl ether, ethylene glycol isobutyl ether, propylene glycol monomethyl ether, propylene glycol monoethyl ether, propylene glycol monopropyl ether, propylene glycol monobutyl ether, diethylene glycol monomethyl ether, diethylene glycol monoethyl ether, dipropylene glycol mono-n-propyl ether, and dipropylene glycol mono-n-butyl ether.

Specific examples of ketones include acetone, methyl ethyl ketone, methyl butyl ketone, methyl isobutyl ketone, diisopropyl ketone, cyclopentanone, and cyclohexanone.

Specific examples of ethers include isopropyl ether, n-butyl ether, tetrahydrofuran, tetrahydropyran, and 1,4-dioxane.

Examples of esters include propylene carbonate, methyl acetate, ethyl acetate, propyl acetate, isopropyl acetate, butyl acetate, isobutyl acetate, amyl acetate, ethyl lactate, ethyl butyrate, dibutyl phthalate, dioctyl phthalate, and cyclic esters such as ε-caprolactone and ε-caprolactam.

Examples of nitrogen-containing compounds include urea, pyrrolidone, N-methyl-2-pyrrolidone, and octylpyrrolidone.

The amount of the water-soluble organic solvent is preferably 20 to 40% by mass in the ink composition.

When the medium is a low-absorption medium (coated paper, etc.), it is preferable to use a solvent that easily penetrates the low-absorption medium.

(Others)

Additives and production methods that can be used for the ink composition for aqueous inkjet recording may be appropriately selected from the additives and production methods disclosed in JP 2017-149906 A, for example.

The pre-coating agent of the present invention and the ink composition for inkjet recording in the ink set for inkjet recording of the present invention may be separately stored in cartridges or the like for use.

In use of the ink set for inkjet recording of the present invention, a precoat layer is formed from the pre-coating agent of the present invention and then printing is performed using the ink composition for inkjet recording.

Use of the ink set for inkjet recording of the present invention in this order can prevent or reduce mottling and bleeding to improve the print image quality and prevent or reduce strike-through of the ink composition for inkjet recording during printing using the ink composition for inkjet recording. Moreover, it can prevent or reduce peeling and a decrease in hardness of an overcoat layer described later.

<Laminate>

The laminate of the present invention sequentially includes, on a substrate, a print layer formed using the ink set for inkjet recording and an overcoat layer containing a resin.

The substrate may be any substrate that is usable as a printing medium. Examples include paper sheets such as thin paper, plain paper, reinforced paper, and resin-impregnated paper, titanium paper, resin sheets such as polyethylene terephthalate sheets, glycol-modified polyethylene terephthalate sheets (PETG sheets), polyvinyl chloride sheets, polyethylene sheets, acrylonitrile-butadiene-styrene sheets, and polypropylene sheets, and composite sheets of these.

Examples of a wooden substrate for a wooden veneer board include known substrates conventionally used as wooden substrates for veneer boards, furniture, building members, and the like, such as plywood, particle board, hard board, and medium density fiberboard (MDF).

The print layer includes, sequentially from the substrate side, a precoat layer formed from the pre-coating agent of the present invention and an ink layer formed from the ink composition for inkjet recording.

The pre-coating agent of the present invention may be applied to the substrate by an application method using any of various application devices such as a blade coater, an air knife coater, a roll coater, a bar coater, a gravure coater, a rod blade coater, a lip coater, a curtain coater, a die coater, and an inkjet system, for example.

The pre-coating agent is preferably applied in an amount of 0.1 to 20 g/m² as a solid content, more preferably 0.1 to 15 g/m² as a solid content in order to suitably impart the coating film durability.

The coated surface which is coated with the pre-coating agent may be dried with a general dryer used in this field, such as a hot air dryer. The coated surface which is coated with the pre-coating agent may be in a completely dried state or a semi-dried state.

The ink composition for inkjet recording is preferably applied by a method employing the inkjet technology.

The ink composition for inkjet recording is preferably applied in an amount of 0.1 to 20 g/m² as a solid content, more preferably 0.1 to 15 g/m² as a solid content in order to suitably impart coating film durability.

The laminate of the present invention has an overcoat layer containing a resin.

The presence of the overcoat layer enables production of a printed image that has excellent glitter and durability.

The overcoat layer contains a resin component that is used in known overcoat layers. Examples of such resin components include melamine resins, alkyd resins, polyamide resins, polyurethane resins, cellulose resins, (meth)acrylic resins, polyolefin resins, polyester resins, vinyl chloride resins, and vinyl acetate resins.

The overcoat layer can be formed by applying an overcoat layer composition containing the resin component and an organic solvent.

The overcoat layer composition may be applied by an application method using any of various application devices such as a blade coater, an air knife coater, a roll coater, a bar coater, a gravure coater, a rod blade coater, a lip coater, a curtain coater, a die coater, and an inkjet system, for example.

Moreover, a known organic solvent may be appropriately selected as an organic solvent contained in the overcoat layer composition.

The overcoat layer composition may also contain known additives such as lubricants, antifoaming agents, surfactants, leveling agents, and pigments.

The amount of the overcoat layer composition to be applied may be appropriately adjusted as needed. For example, the amount in terms of the solid content is preferably 0.1 to 100 g/m². From the standpoint of suitably imparting the coating film durability, the amount in terms of the solid content is more preferably 0.1 to 80 g/m².

The laminate of the present invention has a print layer formed using the ink set including the above-described pre-coating agent of the present invention, which ensures good print image quality, can prevent or reduce strike-through of the ink composition for inkjet recording, and can prevent or reduce peeling or a decrease in hardness of the overcoat layer.

EXAMPLES

Hereinafter, the present invention will be described in more detail with reference to examples below, but the present invention is not limited to these examples. Unless otherwise specified, "%" means "% by mass" and "part(s)" means "part(s) by mass".

The materials used in the examples and comparative examples are listed below.
<Inorganic Particles>
SYLYSIA 310 (porous silica, particle size 4 μm, pore volume 60 mL/g, average pore size 21 nm, available from Fuji Silysia Chemical Ltd.)

SYLYSIA 380 (porous silica, particle size 9 μm, pore volume 60 mL/g, average pore size 21 nm, available from Fuji Silysia Chemical Ltd.)
ST-ZL (colloidal silica (non-porous), particle size 80 nm, available from Nissan Chemical Corporation)
SYLYSIA 470 (porous silica, particle size 14 μm, pore volume 1.25 mL/g, average pore size 14 nm, available from Fuji Silysia Chemical Ltd.)
<Amine Salt of Organic Acid>
triammonium citrate
diammonium malate
ammonium lactate
<Organic Acid>
citric acid
<Metal Salt of Organic Acid>
trisodium citrate
<Polyvalent Metal Salt>
calcium acetate
<Resin Emulsion>
Joncryl PDX-7741 (solid content 50% by mass, styrene-acrylic emulsion, available from BASF, glass transition temperature 0° C.)
Rika bond S401 (solid content 50% by mass, vinyl acetate emulsion, available from Japan Coating Resin Co., Ltd., glass transition temperature <0° C.)
<Surfactant>
Olfine E1010 (available from Nisshin Chemical Co., Ltd.)
<Thickener>
Primal ASE-95NP (polyacrylic acid, available from DOW, anionic)
<pH Adjuster>
NH₃ water
<Water>
purified water Examples 1 to 13, Comparative Examples 1 to 9

The above materials were blended at the blending ratios shown in Table 1, and thoroughly stirred to prepare mixtures. The mixtures were filtered through a metal filter (#200 mesh) to prepare pre-coating agents of examples and comparative examples.

In the case of the pre-coating agents of Comparative Examples 6 and 9, the dispersion stability of the materials was too low, and evaluations described below could not be performed thereon.
<Preparation of Ink Composition for Aqueous Inkjet Recording>
(Aqueous Resin Varnish)

Twenty parts by mass of an acrylic acid/n-butyl acrylate/benzyl methacrylate/styrene copolymer having a glass transition temperature of 40° C., a weight average molecular weight of 30,000 and an acid value of 185 mg KOH/g was dissolved in a mixed solution containing 2.5 parts by mass of potassium hydroxide and 77.5 parts by mass of water, whereby an aqueous resin varnish having a solid content of 20% was obtained.
(Preparation of Aqueous Black Ink Base)

To 23.7 parts by mass of the aqueous resin varnish was added 64.3 parts by mass of water and mixed, whereby a resin varnish for pigment dispersion was prepared. To this varnish was further added 12 parts by mass of carbon black (trade name: Printex 90, available from Degussa), followed by mixing by stirring and subsequent kneading in a wet circulation mill, whereby an aqueous black ink base was prepared.

(Preparation of Aqueous Yellow Ink Base)

To 23.7 parts by mass of the aqueous resin varnish was added 64.3 parts by mass of water and mixed, whereby a resin varnish for pigment dispersion was prepared. To this varnish was further added 12 parts by mass of a yellow pigment (trade name: Novoperm Yellow 4G 01, available from Clariant), followed by mixing by stirring and subsequent kneading in a wet circulation mill, whereby an aqueous yellow ink base was prepared.

(Preparation of Aqueous Magenta Ink Base)

To 23.7 parts by mass of the aqueous resin varnish was added 64.3 parts by mass of water and mixed, whereby a resin varnish for pigment dispersion was prepared. To this varnish was further added 12 parts by mass of a magenta pigment (trade name: Ink Jet Magenta E5B 02, available from Clariant), followed by mixing by stirring and subsequent kneading in a wet circulation mill, whereby an aqueous magenta ink base was prepared.

(Preparation of Aqueous Cyan Ink Base)

To 23.7 parts by mass of the aqueous resin varnish was added 64.3 parts by mass of water and mixed, whereby a resin varnish for pigment dispersion was prepared. To this varnish was further added 12 parts by mass of a cyan pigment (trade name: Heliogen Blue L 7101 F, available from BASF), followed by mixing by stirring and subsequent kneading in a wet circulation mill, whereby an aqueous cyan ink base was prepared.

(Preparation of Black Ink Composition)

The materials listed below, other than the aqueous black ink base, in amounts shown below were mixed and stirred sufficiently. To the mixture was added 33 parts by mass of the aqueous black ink base with stirring.

After sufficient stirring, the mixture was filtered through a metal filter (#3500 mesh) and degassed using a hollow fiber membrane, whereby an aqueous black ink was prepared.

aqueous black ink base: 33 parts by mass
    surfactant (Olfine E1010, available from Nisshin Chemical Co., Ltd.): 0.5 parts by mass
    glycerol: 15 parts by mass
    diethylene glycol: 14.5 parts by mass
    water: 37 parts by mass (Preparation of Yellow Ink Composition)

A yellow ink composition was prepared as in the preparation of the black ink composition, except that the aqueous black ink base was changed to the aqueous yellow ink base.

(Preparation of Magenta Ink Composition)

A magenta ink composition was prepared as in the preparation of the black ink composition, except that the aqueous black ink base was changed to the aqueous magenta ink base.

(Preparation of Cyan Ink Composition)

A cyan ink composition was prepared as in the preparation of the black ink composition, except that the aqueous black ink base was changed to the aqueous cyan ink base.

(Preparation of Overcoat Layer Composition)

The materials listed below in amounts shown below were mixed and sufficiently stirred to prepare a mixture.

The mixture was filtered through a metal filter (#200 mesh) to prepare an overcoat layer composition.

dimethylol melamine (S260, available from Nippon Carbide Industries Co., Inc.): 50 parts by mass
    surfactant (Surfynol 440, available from Nissin Chemical Co., Ltd.): 1 part by mass
    2-pyrrolidone: 10 parts by mass
    water: 39 parts by mass <Evaluation of Physical Properties of Pre-Coating Agent>

(Strike-Through)

The pre-coating agents prepared in the examples and comparative examples were each applied to paper using a 0.1-mm bar coater and dried at 80° C. for three minutes. Then, cartridges of an inkjet printer PX105 (available from Seiko Epson Corporation) were filled with the ink compositions for aqueous inkjet printing, and printing was performed. The presence or absence of strike-through was checked and evaluated based on the following criteria. Table 1 shows the results.

The pre-coating agents rated as Good or Fair are acceptable.

Good: No strike-through is observed
    Fair: Slight strike-through is observed
    Poor: Significant strike-through is observed (Bleeding)

The pre-coating agents prepared in the examples and comparative examples were applied to paper using a 0.1-mm bar coater and dried at 80° C. for three minutes. Then, cartridges of an inkjet printer PX105 (available from Seiko Epson Corporation) were filled with the ink compositions for aqueous inkjet printing, and printing was performed. The presence or absence of bleeding (color-to-color bleeding) was checked and evaluated based on the following criteria. Table 1 shows the results.

The pre-coating agents rated as Good or Fair are acceptable.

Good: No bleeding is observed
    Fair: Slight bleeding is observed
    Poor: Significant bleeding is observed (Mottling)

The pre-coating agents prepared in the examples and comparative examples were applied to paper using a 0.1-mm bar coater and dried at 80° C. for three minutes. Then, cartridges of an inkjet printer PX105 (available from Seiko Epson Corporation) were filled with the ink compositions for aqueous inkjet printing, and 100% solid printing was performed. The presence or absence of streaks in the solid portion was evaluated based on the following criteria. Table 1 shows the results.

The pre-coating agents rated as Good or Fair are acceptable.

Good: No streaks are observed in the solid portion
    Fair: Slight streaks are observed
    Poor: Significant streaks are observed <Overcoatability>

In the examples and comparative examples, to the printed matter that was not evaluated as Poor for any of "Strike-through", "Bleeding", and "Mottling" was applied the overcoat layer composition twice with a 0.3-mm bar coater, followed by reaction at 150° C. for 10 minutes, whereby an overcoat layer was formed.

The coat layer was wiped 10 times with a non-woven fabric impregnated with hydrochloric acid (1N), and the state of the surface of the overcoat layer was visually observed.

The pre-coating agent used in the printed matter with an overcoat layer evaluated as Good was considered to prevent or reduce peeling and a decrease in hardness.

Good: No peeling or dissolution of the overcoat layer is observed
    Poor: Peeling or dissolution of the overcoat layer is observed

TABLE 1

| | | | Example | | | | | | | | |
|---|---|---|---|---|---|---|---|---|---|---|---|
| | | | 1 | 2 | 3 | 4 | 5 | 6 | 7 | 8 | 9 |
| Pre-coating agent | Inorganic particles | SYLYSIA 310 | 5 | 1 | 3 | 10 | — | 5 | 5 | 5 | 5 |
| | | SYLYSIA 380 | — | — | — | — | 5 | — | — | — | — |
| | | ST-ZL | — | — | — | — | — | — | — | — | — |
| | | SYLYSIA 470 | — | — | — | — | — | — | — | — | — |
| | Amine salt of organic acid | Tri-ammonium citrate | 5 | 5 | 5 | 5 | 5 | 1 | 3 | 10 | 5 |
| | | Di-ammonium malate | — | — | — | — | — | — | — | — | — |
| | | Ammonium lactate | — | — | — | — | — | — | — | — | — |
| | Organic acid | Citric acid | — | — | — | — | — | — | — | — | — |
| | Organic acid metal salt | Trisodium citrate | — | — | — | — | — | — | — | — | — |
| | Polyvalent metal salt | Calcium acetate | — | — | — | — | — | — | — | — | — |
| | Resin emulsion (solid content) | Joncryl 7741 | 0.5 | 0.5 | 0.5 | 0.5 | 0.5 | 0.5 | 0.5 | 0.5 | 1 |
| | | Rika bond S-401 | 0.5 | 0.5 | 0.5 | 0.5 | 0.5 | 0.5 | 0.5 | 0.5 | — |
| | Surfactant (solid content) | Olfine E1010 | 0.5 | 0.5 | 0.5 | 0.5 | 0.5 | 0.5 | 0.5 | 0.5 | 0.5 |
| | Thickener (solid content) | ASE95 | 0.5 | 0.5 | 0.5 | 0.5 | 0.5 | 0.5 | 0.5 | 0.5 | 0.5 |
| | pH adjuster | NH₃ water | 0.1 | 0.1 | 0.1 | 0.1 | 0.1 | 0.1 | 0.1 | 0.1 | 0.1 |
| | Water | | 87.9 | 91.9 | 89.9 | 82.9 | 87.9 | 91.9 | 89.9 | 82.9 | 87.9 |
| | Total (% by mass) | | 100 | 100 | 100 | 100 | 100 | 100 | 100 | 100 | 100 |
| Physical properties | Viscosity | Zahn cup No. 3 (sec) | 20 | 10 | 15 | 40 | 20 | 20 | 20 | 20 | 20 |
| | pH | | 8.5 | 8.5 | 8.5 | 8.5 | 8.5 | 7.5 | 8.5 | 9.0 | 8.5 |
| Evaluation results | Strike-through | | Good | Fair | Good | Good | Good | Good | Good | Good | Good |
| | Bleeding | | Good | Good | Good | Good | Good | Fair | Good | Good | Good |
| | Mottling | | Good | Good | Good | Fair | Good | Good | Good | Good | Good |
| | Overcoatability | | Good | Good | Good | Good | Good | Good | Good | Good | Good |

| | | | Example | | | | Comparative Example | | | |
|---|---|---|---|---|---|---|---|---|---|---|
| | | | 10 | 11 | 12 | 13 | 1 | 2 | 3 | 4 |
| Pre-coating agent | Inorganic particles | SYLYSIA 310 | 5 | 5 | 5 | 5 | — | 5 | 10 | — |
| | | SYLYSIA 380 | — | — | — | — | — | — | — | — |
| | | ST-ZL | — | — | — | — | — | — | — | 5 |
| | | SYLYSIA 470 | — | — | — | — | — | — | — | — |
| | Amine salt of organic acid | Tri-ammonium citrate | 5 | 5 | — | — | 5 | — | — | 5 |
| | | Di-ammonium malate | — | — | 15 | — | — | — | — | — |
| | | Ammonium lactate | — | — | — | 20 | — | — | — | — |
| | Organic acid | Citric acid | — | — | — | — | — | — | — | — |
| | Organic acid metal salt | Trisodium citrate | — | — | — | — | — | — | — | — |
| | Polyvalent metal salt | Calcium acetate | — | — | — | — | — | — | — | — |
| | Resin emulsion (solid content) | Joncryl 7741 | — | 0.5 | 0.5 | 0.5 | 0.5 | 0.5 | 0.5 | 0.5 |
| | | Rika bond S-401 | 1 | 0.5 | 0.5 | 0.5 | 0.5 | 0.5 | 0.5 | 0.5 |

TABLE 1-continued

| | | | | | | | | | | |
|---|---|---|---|---|---|---|---|---|---|---|
| | Surfactant (solid content) | Olfine E1010 | 0.5 | 0.5 | 0.5 | 0.5 | 0.5 | 0.5 | 0.5 | 0.5 |
| | Thickener (solid content) | ASE95 | 0.5 | — | 0.5 | 0.5 | 0.5 | 0.5 | 0.5 | 0.5 |
| | pH adjuster | $NH_3$ water | 0.1 | — | 0.1 | 0.1 | 0.1 | 0.1 | 0.1 | 0.1 |
| | Water | | 87.9 | 88.5 | 77.9 | 72.9 | 92.9 | 92.9 | 87.9 | 87.9 |
| | Total (% by mass) | | 100 | 100 | 100 | 100 | 100 | 100 | 100 | 100 |
| Physical properties | Viscosity | Zahn cup No. 3 (sec) | 20 | 10 | 20 | 20 | 10 | 20 | 35 | 35 |
| | pH | | 8.5 | 7.5 | 8.5 | 8.5 | 8.5 | 8.5 | 8.5 | 8.5 |
| Evaluation results | Strike-through | | Good | Good | Good | Good | Poor | Poor | Fair | Fair |
| | Bleeding | | Good | Good | Good | Fair | Poor | Poor | Poor | Poor |
| | Mottling | | Good | Good | Good | Fair | Fair | Fair | Good | Good |
| | Overcoatability | | Good | Good | Good | Good | Not evaluated | Not evaluated | Not evaluated | Not evaluated |

| | | | Comparative Example | | | | |
|---|---|---|---|---|---|---|---|
| | | | 5 | 6 | 7 | 8 | 9 |
| Pre-coating agent | Inorganic particles | SYLYSIA 310 | — | 5 | 5 | — | 5 |
| | | SYLYSIA 380 | — | — | — | — | — |
| | | ST-ZL | — | — | — | — | — |
| | | SYLYSIA 470 | 5 | — | — | — | — |
| | Amine salt of organic acid | Tri-ammonium citrate | 5 | — | — | — | 3 |
| | | Di-ammonium malate | — | — | — | — | — |
| | | Ammonium lactate | — | — | — | — | — |
| | Organic acid | Citric acid | — | 5 | — | — | — |
| | Organic acid metal salt | Trisodium citrate | — | — | 5 | — | — |
| | Polyvalent metal salt | Calcium acetate | — | — | — | 5 | 2 |
| | Resin emulsion (solid content) | Joncryl 7741 | 0.5 | 0.5 | 0.5 | — | 0.5 |
| | | Rika bond S-401 | 0.5 | 0.5 | 0.5 | — | 0.5 |
| | Surfactant (solid content) | Olfine E1010 | 0.5 | 0.5 | 0.5 | 0.5 | 0.5 |
| | Thickener (solid content) | ASE95 | 0.5 | 0.5 | 0.5 | — | 0.5 |
| | pH adjuster | $NH_3$ water | 0.1 | 0.1 | 0.1 | — | 0.1 |
| | Water | | 87.9 | 87.9 | 87.9 | 94.5 | 87.9 |
| | Total (% by mass) | | 100 | 100 | 100 | 100 | 100 |
| Physical properties | Viscosity | Zahn cup No. 3 (sec) | 35 | Preparation not allowed | 10 | 8 | Preparation not allowed |
| | pH | | 8.5 | 3.5 | 8.5 | 6.5 | 7.5 |
| Evaluation results | Strike-through | | Fair | Not evaluated | Poor | Good | Not evaluated |
| | Bleeding | | Poor | Not evaluated | Poor | Good | Not evaluated |
| | Mottling | | Good | Not evaluated | Good | Good | Not evaluated |
| | Overcoatability | | Not evaluated | Not evaluated | Not evaluated | Poor | Not evaluated |

19

In the examples in which a pre-coating agent containing inorganic particles having a particle size of 1 μm to 10 μm, an amine salt of an organic acid, a resin emulsion, and water was used, it was confirmed that the pre-coating agent without containing a polyvalent metal salt could prevent or reduce mottling and bleeding to improve the print image quality and prevent or reduce strike-through of the ink composition for inkjet recording during printing using an ink composition for inkjet recording, and could prevent or reduce peeling and a decrease in hardness of an overcoat layer in formation of the overcoat layer.

INDUSTRIAL APPLICABILITY

The present invention can provide a pre-coating agent capable of, without containing a polyvalent metal salt, preventing or reducing mottling and bleeding to improve the print image quality and preventing or reducing strike-through of the ink composition for inkjet recording during printing using an ink composition for inkjet recording, as well as being capable of preventing or reducing peeling and a decrease in hardness of an overcoat layer in the post-process (formation of the overcoat layer).

The invention claimed is:

1. A pre-coating agent for forming a precoat layer that receives an ink composition for inkjet recording, the pre-coating agent comprising:
    inorganic particles;
    an amine salt of an organic acid;
    a resin emulsion; and
    water,
    wherein the inorganic particles have a particle size in a range from 1 μm to 10 μm,

the pre-coating agent is free from a polyvalent metal salt that forms metal ions having a valence of 2 or higher, and
the resin emulsion comprises at least one emulsion selected from the group consisting of a styrene-acrylic emulsion and a vinyl acetate emulsion.

2. The pre-coating agent according to claim 1, wherein the inorganic particles are porous silica particles.

3. The pre-coating agent according to claim 1, wherein the amine salt of an organic acid is a salt obtained by neutralizing at least one acid selected from the group consisting of polyacrylic acid, formic acid, acetic acid, glycolic acid, malonic acid, malic acid, maleic acid, succinic acid, glutaric acid, fumaric acid, citric acid, tartaric acid, lactic acid, and derivatives thereof, with an amine.

4. An ink set for inkjet recording, comprising: the pre-coating agent according to claim 1; and an ink composition for inkjet recording.

5. The ink set for inkjet recording according to claim 4, wherein the ink composition for inkjet recording is an ink composition for aqueous inkjet recording.

6. The ink set for inkjet recording according to claim 5, wherein the ink composition for aqueous inkjet recording comprises a pigment coated with an alkali-soluble resin, a basic compound, and a water-soluble organic solvent.

7. A laminate sequentially comprising, on a substrate, a print layer formed using the ink set for inkjet recording according to claim 4, and an overcoat layer containing a resin.

8. The pre-coating agent according to claim 1, wherein the pre-coating agent is free from a polyvalent metal salt.

* * * * *